March 24, 1959 R. E. ZUM BAHLEN ET AL 2,878,870
CODE PUNCHING AND KEYING MACHINE
Filed June 16, 1955 5 Sheets-Sheet 1
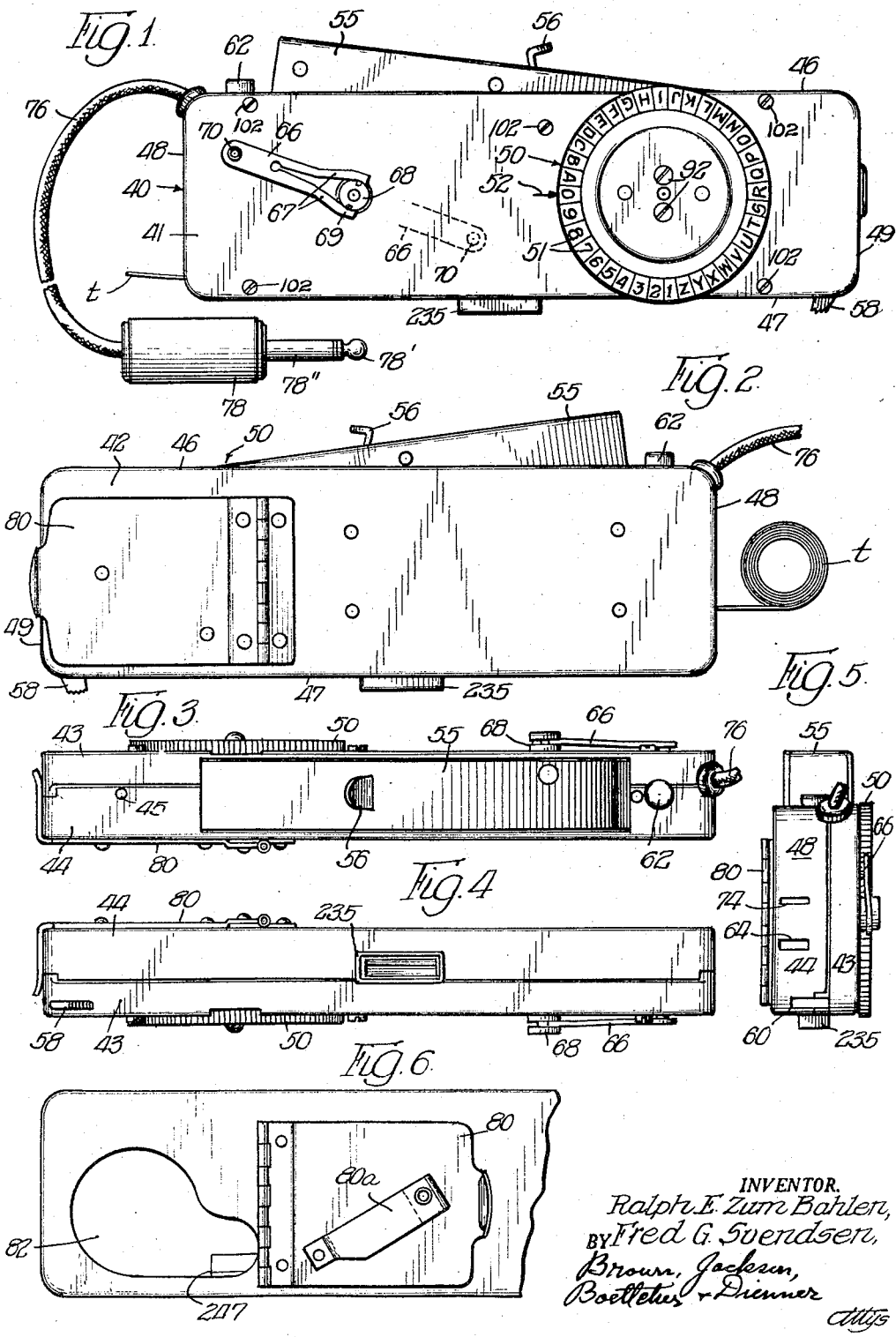
INVENTOR.
Ralph E. Zum Bahlen,
BY Fred G. Svendsen,
Brown, Jackson,
Boettcher & Dienner
Attys

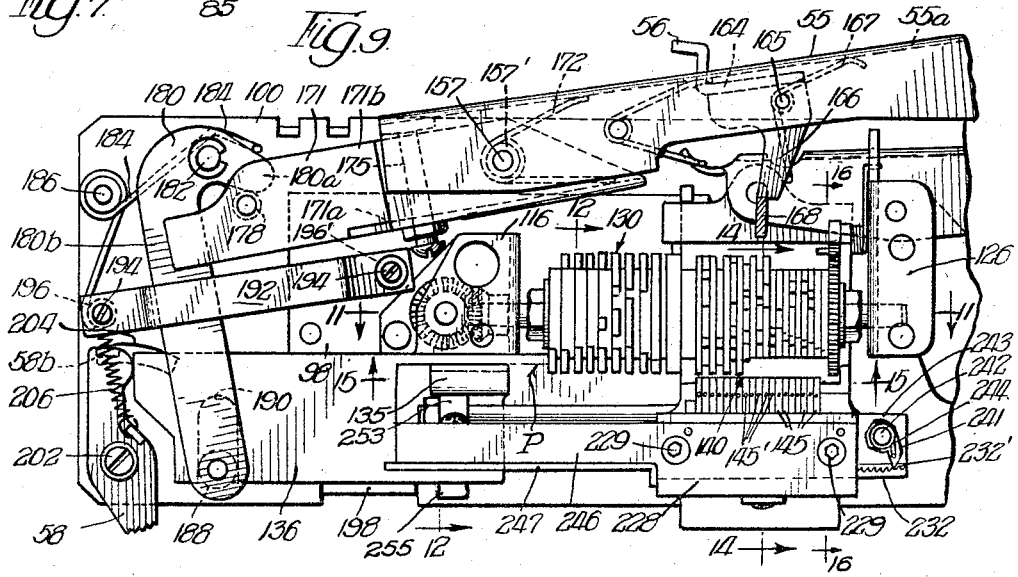

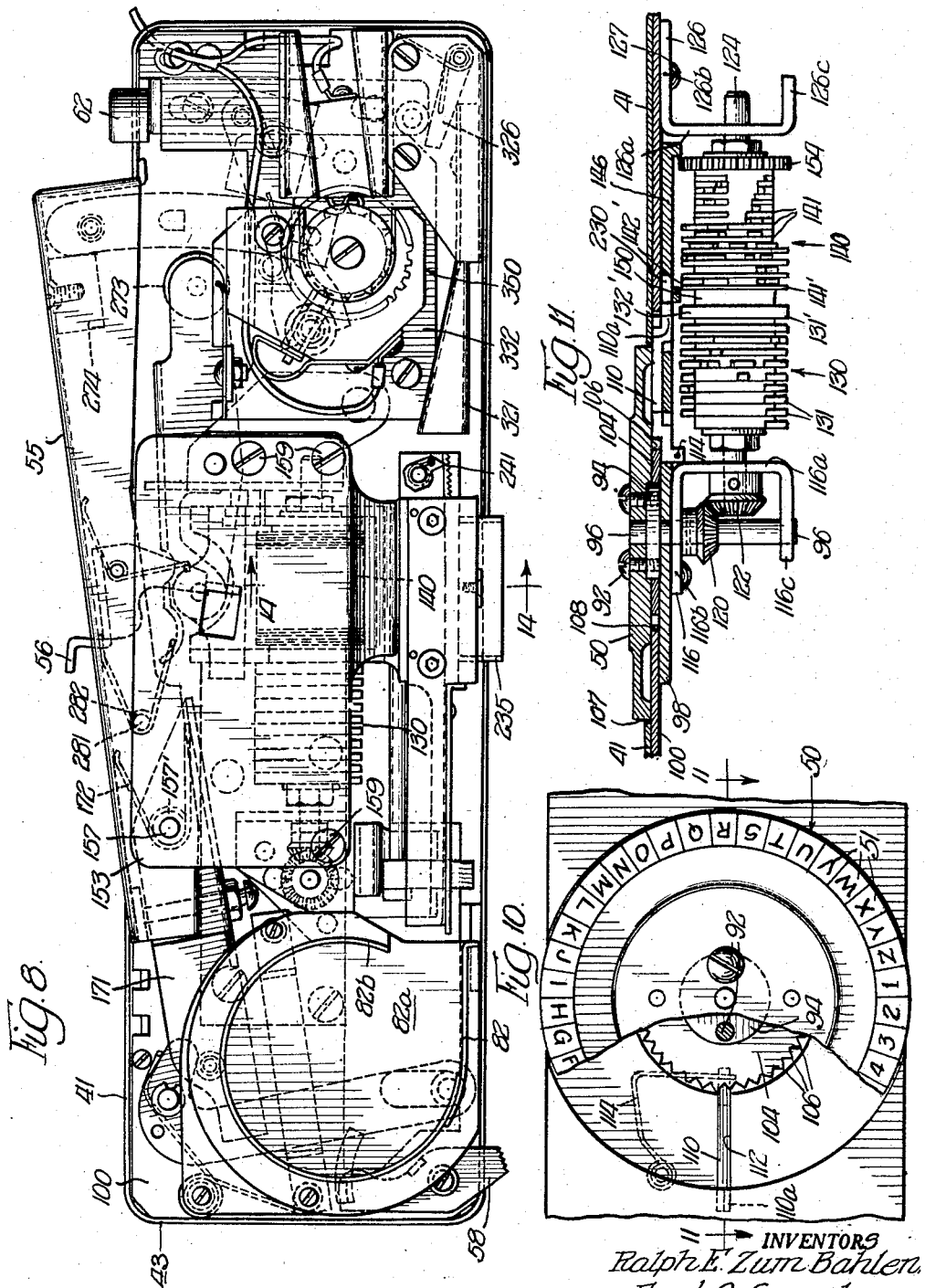

March 24, 1959 R. E. ZUM BAHLEN ET AL 2,878,870
CODE PUNCHING AND KEYING MACHINE
Filed June 16, 1955 5 Sheets-Sheet 4
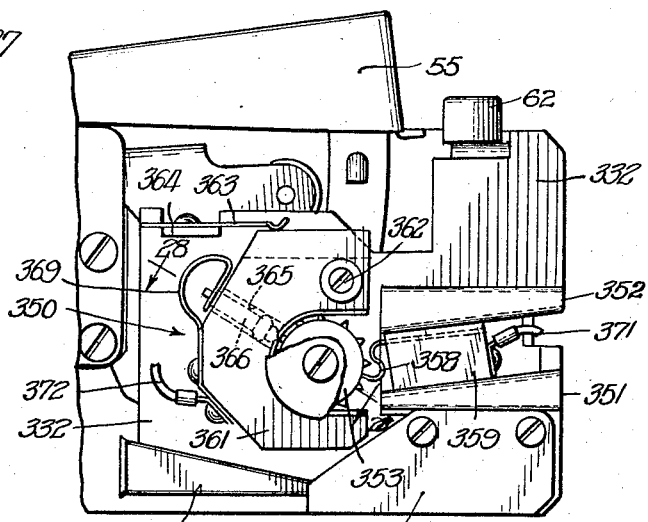
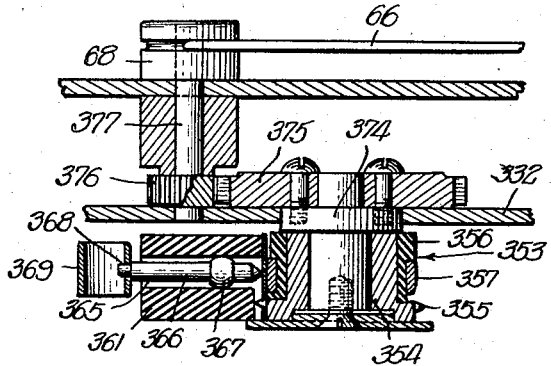
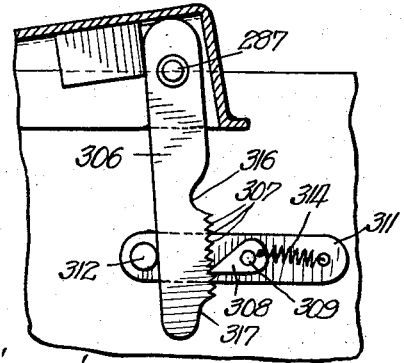
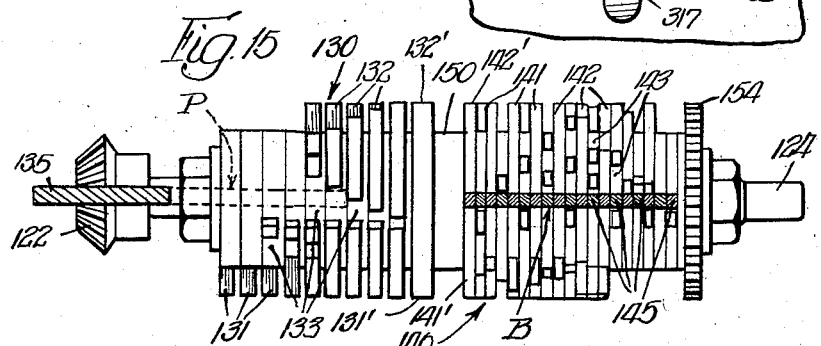
INVENTORS
Ralph E. Zum Bahlen,
BY Fred G. Svendsen,
Brown, Jackson,
Brettauer + Diemer
Attys March 24, 1959 R. E. ZUM BAHLEN ET AL 2,878,870
CODE PUNCHING AND KEYING MACHINE
Filed June 16, 1955 5 Sheets-Sheet 5
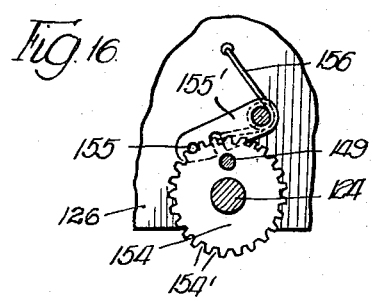
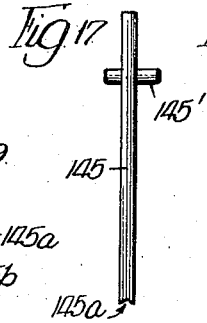
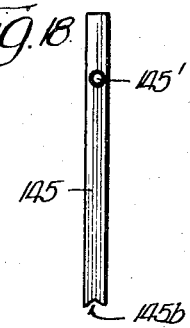
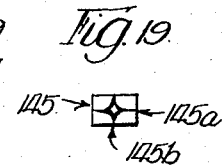
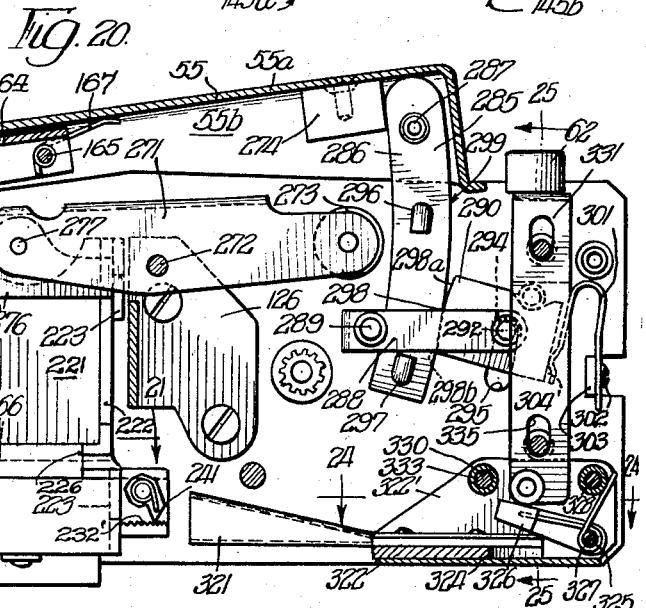
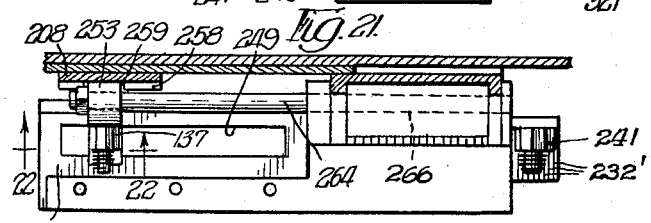
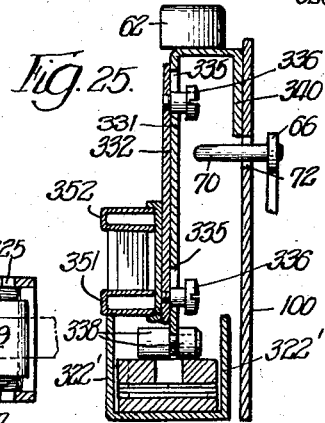
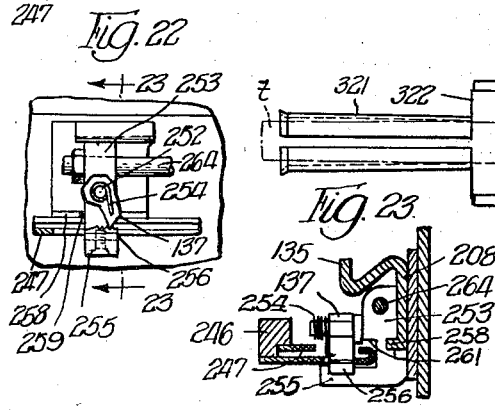
INVENTORS.
Ralph E. Zum Bahlen,
BY Fred G. Svendsen,
Brown, Jackson,
Boettcher + Dienner
ATTYS.

United States Patent Office 2,878,870
Patented Mar. 24, 1959

2,878,870

CODE PUNCHING AND KEYING MACHINE

Ralph E. Zum Bahlen, Northbrook, and Fred G. Svendsen, Chicago, Ill., assignors to Stenographic Machines, Inc., Chicago, Ill., a corporation of Illinois Application June 16, 1955, Serial No. 515,938

11 Claims. (Cl. 164—111)

The present invention relates to a code punching and keying machine operative to punch a message in code in a tape, and to key or transmit this coded message from the tape.

Our improved machine comprises a selector dial having inscribed thereon the letters of the alphabet and a scale of numerals; and it also comprises a lever or like actuating device for performing the punching operation. In the use of the machine, the selector dial is turned to bring each letter or numeral of the message into selected position, whereupon the punching lever is actuated to punch in the tape the code symbol corresponding to the selected letter or numeral. In the illustrated embodiment herein shown, our improved machine has been constructed to use the code symbols of the International Morse code, but obviously any other established code or special code may be used.

In the illustrated embodiment herein shown, the machine has been designed to use 8 mm. motion picture film as the tape adapted to have the code symbols punched therein, but it will be understood that the machine is capable of using other forms of tape, or can be readily designed to use any other form of tape, suitable to the purpose. For example, the machine will perforate a number of different types of plastic tape as well as paper tape and even very thin metal tape.

One of the main objects of the invention is to provide such a machine in which the conversion from the letters and numerals of the message into the coded symbols corresponding thereto is accomplished automatically, and in which the keying or transmission of the coded message is accomplished automatically, without requiring any knowledge of the code symbols on the part of the operator.

Another object of the invention is to provide such a machine in which the spacing between successive code symbols punched in the tape is accomplished automatically, and is maintained at a fixed distance for the various letters of a word, irrespective of the different lengths of different code symbols.

Another object of the invention is to provide a machine of the above general description which will be compact and readily portable, being of such small size that it can be carried in a brief case, overcoat pocket, or other small space. However, the machine can be constructed in larger sizes, if desired.

Another object of the invention is to provide such a machine in which the punching lever has a safety stop or safety release to prevent the accidental operation of the punching lever.

Another object of the invention is to provide such a machine having a word spacing lever which can be conveniently operated for establishing appropriate spacing between words in the punched symbols in the tape, or between sentences or for other required intervals.

Another object is to provide an improved tape cut-off mechanism for cutting the tape upon the completion of a message. The cut-off mechanism cuts an arrowhead formation denoting the leading edge of the tape, and cuts an arrow notch formation denoting the trailing end of the tape.

Other objects, features and advantages of the invention will be apparent from the following detail description of one preferred embodiment thereof. In the accompanying drawings illustrating such embodiment:

Figure 1 is an elevational view of the front side of the machine on which are mounted the selector dial for the punching apparatus and the operating crank for the keying apparatus;

Figure 2 in an elevational view of the back side of the machine showing the hinged cover or door for closing the tape receiving magazine;

Figure 3 is a plan view of the top side of the machine;

Figure 4 is an elevational view of the bottom side of the machine;

Figure 5 is an elevational view of that end of the machine from which the punched tape issues;

Figure 6 is a fragmentary elevational view of the rear side of the machine showing the hinged cover open for affording access to the tape magazine;

Figure 7 is an elevational view on an enlarged scale of a section of tape in which code symbols have been punched, showing the constant spacing between several different length symbols making up a word;

Figure 8 is an elevational view of the entire assembly of the machine, as viewed from the rear with the rear housing section removed;

Figure 9 is a fragmentary view of a portion of Figure 8, with the film magazine and the punch stripper plate removed to show the mechanism lying in back of these parts;

Figure 10 is a fragmentary view showing the indexing disc associated with the selecting dial;

Figure 11 is a horizontal sectional view taken on the plane of the line 11—11 of Figures 9 and 10;

Figure 12 is a fragmentary sectional view taken on the plane of the line 12—12 of Figure 9, showing the clearance area of one of the tape feed stop discs aligned with the tape feed stop finger;

Figure 13 is a fragmentary view similar to Figure 12 but showing a stop segment of one of the tape feed stop discs blocking movement of the tape feed stop finger;

Figure 14 is a fragmentary sectional view taken on the plane of the line 14—14 of Figures 8 and 9 showing the clearance area of one of the selector discs aligned with its respective perforating punch;

Figure 15 is a sectional view taken on the plane of the line 15—15 of Figure 9, showing the operating relation of the stop finger to the tape feed stop mechanism and the relation of the perforating punches to the punch selector mechanism;

Figure 16 is a fragmentary sectional view taken approximately on the plane of the line 16—16 of Figure 9 showing the indexing disc or gear associated with the tape feed stop discs and the punch selector discs;

Figures 17 and 18 are detail elevational views of one of the perforating punches on an enlarged scale, and Figure 19 is an end view of one of the punches on a still larger scale;

Figure 20 is a fragmentary elevational view of the keying end of the machine, showing the mechanism which transmits motion from the punching lever to the perforating slide;

Figure 21 is a sectional view taken on the plane of the line 21—21 of Figure 20;

Figure 22 is a detail sectional view taken on the plane of the line 22—22 of Figure 21;

Figure 23 is a detail sectional view taken on the plane of the line 23—23 of Figure 22;

Figures 24 and 25 are detail sectional views of the tape cut-off mechanism, taken on the planes of the lines 24—24 and 25—25 of Figure 20;

Figure 26 is a fragmentary elevational view of a modified form of full-stroke mechanism;

Figure 27 is a side elevational view of the keying mechanism;

Figure 28 is a sectional view taken on the plane of the line 28—28 of Figure 27.

The scale of the several figures will be evident from the fact that a typical embodiment of the invention is only slightly more than eight inches in length.

Referring first to Figures 1 to 6 inclusive, the machine comprises a housing 40 consisting of a front housing section 41 and a rear housing section 42. These two housing sections are provided with overlapping marginal flanges 43 and 44 which are secured together by screws 45, these overlapping marginal flanges defining a top wall 46, a bottom wall 47, and the two end walls 48 and 49. The subsequent reference to top, bottom, upper, lower, horizontal and vertical are merely for facility of description, having reference to the normal or intended operating position of the machine as shown in Figure 1, although it will be understood that the machine may be operated in any position. We shall first describe the several external controls before describing the internal construction of the machine.

Mounted at the front side of the housing is a selector dial 50 having a ring of symbols 51 marked around its outer peripheral portion, comprising the letters of the alphabet A to Z, and a scale of numerals from 1 through 9 to 0. It will be understood that any other symbols may be employed in addition to or instead of those illustrated. These symbols 51 are adapted to be rotated into registration with a stationary index marker 52 inscribed on the front housing section 41. For illustrative purposes, 36 symbols are shown, representing 36 positions or stations into which the selector dial 50 can be rotated in the coding of a message, it being understood, however, that the dial may have a greater or lesser number of symbols if desired.

Upon each symbol 51 being rotated into registration with the stationary index marker 52, a punching operation is then performed on the tape through the downward squeezing or depressing of a punching lever 55 which projects from the top side 46 of the housing. Projecting from the top side of the punching lever 55 is a safety button 56 which must be deliberately depressed in a releasing operation, before the punching lever 55 is free to be depressed in a punching operation.

Projecting downwardly from the bottom wall 47 of the housing 40 is a word spacing lever 58 which is adapted to be oscillated in an endwise direction in the operation of establishing spaces between the successive words of the message.

The punched or perforated tape $t$ is shown issuing from a discharge slot 60 (Figure 5) formed in the bottom of the left hand end wall 48 of the housing, as viewed in Figure 1. After the entire message has been punched out in the tape, that portion of the tape containing the punched message is adapted to be cut off from the remaining supply of tape still in the machine, through the actuation of a tape cut-off button 62 which projects from the top wall 46 of the housing 40, at a point immediately beyond the end of the punching lever 55. The actuation of this cut-off button shears the tape at a point in immediate proximity to the discharge slot 60, thereby freeing the punched portion of the tape containing the complete message. As will hereinafter appear in detail, the tape is sheared along V-shaped lines, so that the leading end of the message-containing portion of tape will be pointed like the head of an arrow, and the trailing end will have a notch comparable to the notched end of an arrow.

The keying of the message is performed by taking the severed length of tape and inserting the pointed end into a tape receiving slot 64 formed in the end wall 48 above the tape discharge slot 60, the tape being inserted with its perforated edge toward the sprocket side of the keyer, as will hereinafter appear. An automatic keying handle 66 is then actuated, this handle being pivoted to a shaft 68 which projects from the front housing section 41, as shown in Figure 1. The outer end of said keying handle carries a handle or crank pin 70 which, in the inoperative position of the handle, fits into an aperture 72 in the front housing section 41 and locks the cut-off mechanism, as will be later described. The handle 66 is placed in operative position by being swung over through 180° into the dotted line position, which is diametrically opposite to the full line position. In this operative position, the crank pin 70 projects outwardly in convenient position for imparting rotative movement to the handle 66. The handle 66 comprises a pair of fork arms 67 which have pivot pin ends 69 engaging in diametrically opposite holes in the hub 68, and exerting a spring biasing action on an annular groove in the hub 68, whereby the handle is spring biased into its operative and inoperative positions, in a manner well known in the art. The rotation of the keying handle 66 feeds the message-containing portion of tape inwardly through slot 64 and through the keying mechanism, this mechanism having an electrical contact arrangement which responds to the coded perforations cut in the tape. As the tape passes through the keying mechanism, it issues from a discharge slot 74 provided in the end wall 48 at a point directly above the tape admission slot 64.

The coded keying pulses occurring in the keying mechanism are transmitted from the machine through an extension cord 76 which terminates in an electrical plug 78, having a tip contact 78' and a sleeve contact 78". This electrical plug is adapted to be received in the appropriate socket receptacle of any conventional transmitter, such as a radio transmitter, a wired transmitter, or any other keyed type of transmitter adapted to transmit code.

The rear housing section 42 is provided with a hinged door 80 which affords access to a tape receiving magazine 82 contained within the housing 40, in which the tape is inserted in rolls of twenty-five foot length, or any other desired length.

In Figure 7, we have illustrated on an enlarged scale a punched section of tape $t$, which is shown in the form of 8 mm. B-wound unprocessed motion picture film having a row of sprocket holes 85 along one edge thereof. However, as previously described, any other suitable form of tape may be used. Our improved machine punches along a median line of this tape the sequence of code symbols each designated $s$. These code symbols are shown in the International Morse code arrangement of dashes and dots, but, as previously stated, this is merely for illustrative purposes because any other established code or any special code may be used. The four symbols $s$ shown in Figure 7 spell out the word "Code" in Morse code symbols; the first symbol $s$ consisting of dash-dot-dash-dot, representing the letter C, the second symbol, consisting of three dashes, representing the letter O, the third symbol, consisting of dash-dot-dot, representing the letter D, and the fourth symbol, consisting of a dot, representing the letter E. All symbols occurring in a word are spaced from each other a fixed distance $d$. The beginning of each code symbol is designated $b$ and the end is designated $e$. The distance between successive words is substantially longer than the distance $d$ between the adjacent symbols of a word.

Referring now to the mechanisms which respond to the rotation of the selector dial 50, this dial is fastened by screws or pins 92 to a flange 94 projecting from a dial mounting shaft 96. The shaft 96 has bearing support directly in back of the flange 94 in a mounting plate 98 which is secured by screws to a relatively large frame plate 100. This large frame plate 100 substantially fills the inside dimensions of the front housing section 41 and is secured thereto by screws 102. Practically all of the operating parts are mounted on this large frame plate 100, and can be removed as a sub-assembly from the housing 40. Figure 8 shows all of the parts which are mounted on large frame plate 100.

Riveted to the inner side of the selector dial 50 is an indexing disc 104 having V-shaped notches 106 in its periphery. This indexing disc fits into aligned circular openings 107 and 108 which are formed in the housing section 41 and in the frame plate 100, concentrically of the dial mounting shaft 96. Engaging in the V-shaped notches 106 is a spring pressed detent 110 which is mounted for sliding movement radially of the indexing disc 104 in slots 112 cut in the frame plate 100 and in the mounting plate 98. A spring 114 acts on the detent slide 110, tending to hold it yieldingly pressed into the V-shaped notches 106 of the indexing disc 104, thereby indexing the selector dial 50 in each of the symbol positions 51. As will be hereinafter described, the detent slide 110 also serves to interlock the punching slide so that the punching slide will be prevented from operating if the selector dial 50 has not been properly indexed.

As shown in Figure 11, the inner end of the dial mounting shaft 96 extends transversely of a U-shaped bearing bracket 116 comprising a back wall 116a from which extend two parallel side leg portions 116b and 116c. The side leg 116b is riveted to the mounting plate 98, and the inner end of the shaft 96 has bearing support in the other side leg 116c. Mounted on the shaft 96 between the side legs of this bearing bracket is a bevel pinion 120 which meshes with another bevel pinion 122 of the same size mounted on a longitudinally extending shaft 124, which has bearing support in the back wall 116a of the bearing bracket 116. The other end of the shaft 124 has bearing support in a bearing bracket 126 comprising a back wall 126a from the sides of which extend parallel side walls 126b and 126c. The side wall 126b is secured by screws 127 to the frame plate 100.

Mounted on the shaft 124 between the two bearing brackets 116 and 126 are a tape feed stop mechanism 130 and a perforating punch selector mechanism 140. The tape feed stop mechanism comprises a series of axially aligned discs 131, all rigidly fastened together on the shaft 124. As shown in Figures 12 and 13, each disc is formed with one or more arcuate stop segments 132, between which stop segments are defined arcuate notches or clearance areas 133. For the thirty-six symbols or positions on the selector dial 50, there are provided nine of these stop discs 131, each having different widths and arrangements of stop segments 132 and clearance areas 133. The narrowest stop segments 132 are no wider than one of the positions of the selector dial 50, i. e. no wider than 1/36 of a circle. The series of nine stop discs 131 is followed at the right hand end of the series by a tenth disc 131' which has a solid peripheral stop portion 132'. These ten stop discs form in effect a rotatable stop drum 130 which rotates synchronously with the manually actuated selector dial 50.

The stop segments 132 on the successive discs 131 are adapted to be rotated into and out of a lowermost position where they intercept and block the horizontal movement of a tape feed stop finger 135. This stop finger 135 has guided travel in a fixed horizontal path P (Figures 9 and 15) which lies in the vertical axial plane of the series of stop discs 131, intersecting the bottom edges of the series of discs. As shown in Figure 9, the stop finger 135 normally stands in a position just beyond the left hand end of the series of stop discs 131. When the punching lever 55 is depressed, the initial movement thereof starts the stop finger 135 traveling toward the right along the path P. Starting with the left hand disc of the series, so long as the stop finger encounters discs which are presenting notches or clearance areas 133 in register with the path P, the stop finger 135 can continue to travel past each successive stop disc. As soon, however, as the stop finger encounters a stop disc which is presenting a blocking segment 132 in register with the path P, the stop finger is thereupon blocked against further travel by such stop disc. The extent of travel of the stop finger along the path P predetermines the amount of tape which is fed for the punching of the particular symbol selected on the selector dial 50. Some symbols will require a considerable length of tape for the punching of the Morse code sequence of dots and/or dashes, whereas other symbols will only require a very short length of tape, as for the punching of a single dot or a single dash. Thus, the width and locations of the blocking segments 132 on the successive stop discs 131 bear a coded relation to the lengths of the Morse code symbols corresponding to the 36 different symbols 51 on the selector dial 50. Accordingly, it will be seen from Figure 7 that by thus measuring the length of tape fed for the punching of each particular symbol, there is assured that a fixed constant distance $d$ will always occur between the ending point $e$ of a previously punched symbol and the beginning point $b$ of the next subsequently punched symbol. Thus, all of the symbols occurring in a given word will always have a constant uniform spacing $d$. It will be seen from the foregoing that the distance from $e$ to $e$ varies in accordance with the symbol selected and also contains a constant amount of tape $d$ in addition to the amount of tape required for the symbol or character itself. As will be later described in detail, the stop finger 135 is carried by a horizontally moving slide 136 which is mechanically connected to respond to the initial depressing movement of the punching lever 55. Also traveling with the horizontally moving slide 136 and stop finger 135 is a tape feeding dog 137 which draws tape from the magazine 82 through a distance determined by the permissible travel of the stop finger 135, as will be later described in detail. The tape magazine 82 is positioned at the lower left hand corner of the machine, as viewed in Figures 6 and 8, and the tape is drawn therefrom by the tape feeding dog 137, which thence propels the tape toward the right through a vertically moving punching slide, to be later described, for discharge through the discharge slot 60 at the opposite end of the machine.

Referring now to the perforating punch selector 140, which is positioned on the shaft 124 directly beyond the stop discs 131, this punch selector 140 also comprises a series of axially aligned discs 141, all rigidly fastened together on the shaft 124. The stop discs 131 and the selector discs 141 are all rigidly keyed to the shaft 124 and to each other by a keying pin 149 which passes through a central collar 150 on the shaft and then passes in turn through each of the discs 131 and 141. To produce the Morse code symbols corresponding to the thirty-six symbols on the selector dial 50, there are provided nineteen of these selector discs 141. The first disc 141' at the left hand end of the series has a solid peripheral portion 142'. The remaining eighteen discs in the series are formed with one or more peripherally extending punching or blocking segments 142, between which blocking segments are defined arcuate notches or clearance areas 143, as clearly shown in Figure 14. The blocking segments and clearance areas on the selector discs 141 are quite similar to the blocking segments and clearance areas on the stop discs 131. The blocking segments 142 of the selector discs 141 are adapted to be rotated into and out of a lowermost position or blocking zone B where they can intercept and block the vertical rising movement of individual perforating punches 145 which are arranged in a bank aligned directly below the bank of selector discs, in the vertical axial plane of these discs. There is a separate perforating punch 145 individual to each selector disc 141, 141'. The punches 145 are carried in a vertically movable tape punching slide 146 which is guided for vertical movement on the face of the large frame plate 100. The slide 146 is formed with a tape guide 147 through which the tape is fed by the tape feeding dog 137. This guided portion of the tape lies directly below the lower ends of the perforating punches 145. The tape punching slide 146 is responsive to actuation of the punching lever 55, whereby the final movement of the punching lever causes the slide 146 to move upwardly, this occurring after the tape feeding slide 136 has completed its tape measuring and advancing operation above described. In such upward movement of the slide 146 all of the perforating punches which are aligned with clearance areas 143 in their individual selector discs 141 can move upwardly with the slide and with the tape contained within the guide 147, so that these punches do not perform any tape punching operation. However, those perforating punches which are aligned with blocking segments 142 on their individual selector discs 141 are prevented from continued upward movement with the slide 146 as soon as they encounter the blocking segments, with the result that the lower ends of these blocked perforating punches are projected by relative movement through the tape guide 147 and through the tape contained therein, thereby punching perforations in the tape. A short length perforation punched by a single perforator 145 represents a dot in the Morse code symbols, whereas a long length perforation punched by three adjacent perforators 145 represents a dash in the Morse code symbols. Thus, the width and locations of the blocking segments 142 on the successive selector discs 141 bear a coded relation to the dot and dash make-up of the Morse code symbols corresponding to the 36 different symbols 51 on the selector dial 50.

It will be seen from the foregoing that the nineteen rigidly connected selector discs 141 and 141' form in effect a rotatable selector drum 140 which rotates synchronously with the manually actuated selector dial 50. This selector drum 140 has 36 stations or positions around its periphery corresponding to the 36 station or positions 51 of the selector dial 50. When any one of the stations or positions 51 of the selector dial 50 is in registry or indexed with the stationary index marker 52, the corresponding station or position of the selector drum 140 is in registry or indexed with the blocking zone B at the lowermost point of the drum 140, where the blocking segments 142 can intercept and block the rising movement of the individual perforating punches 145. Each station or position of the selector drum 140 has a longitudinally distributed coded pattern of blocking segments 142 representing the Morse code symbol of the corresponding letter or numeral on the selector dial 50. For example, taking the word "Code" from Figure 7, when the letter "C" is in indexed position on the selector dial 50 the coded pattern of blocking segments 142 in the blocking zone B will have blocking segments on selector discs 1, 2, 3, 5, 7, 8, 9 and 11 (counting these discs from the left); when the letter "O" is in indexed position the coded pattern in the blocking zone will have blocking segments on selector discs 1, 2, 3, 5, 6, 7, 9, 10 and 11; when the letter "D" is in indexed position the coded pattern in the blocking zone will have blocking segments on selector discs 1, 2, 3, 5 and 7; and when the letter "E" is in indexed position the coded pattern in the blocking zone will have a blocking segment on selector disc 1 (which latter selector disc 141' has a continuous blocking segment 142' encircling the entire disc). In connection with the above designation of discs, it will be remembered that a hole made by a single punch represents a dot while a slot made by three adjacent punches represents a dash. The coded pattern is, of course, transferred from the selector discs to their respective perforating punches 145 for selectively rendering these punches operative to punch the tape upon the completion of the upward movement of the tape guide 147 carrying the tape with it.

Those perforating punches which punch perforations in the tape are stripped from the tape during the descending movement of the slide 146 through the action of stripping pins 145' engaging the lip 152 of a stripper plate 153. Each perforator 145 has such a stripping pin 145' projecting therefrom in position to be engaged by the stripping lip 152 in the descending movement of the slide 146. The stripper plate 153 has been removed in Figure 9, in order to reveal the parts lying back of this plate.

In addition to the indexing of the selector dial 50 by the indexing disc 104, the rotative assembly comprising the tape feed stop mechanism 130 and the perforating punch selector 140 is also indexed or ratcheted into each of the 36 positions of the selector dial 50 by a separate indexing disc 154 (Figure 16) which is secured to the right hand end of the series of selecting discs 141. This indexing disc 154 has 36 V-shaped notches 154' in its periphery in which engages an indexing pin 155 on a lever 155' which is pivoted to the bearing bracket 126, the pin being normally urged into said notches by a spring 156.

We shall now describe the mechanism which moves the tape feeding slide 136 in response to operation of the punching lever 55. The punching lever 55 comprises a top web or wall 55a and two downwardly extending side flanges 55b through which extends a transverse pivot pin 157 carrying a pivot sleeve 157', the punching lever pivoting around pivot pin 157. One end of this pivot pin 157 is mounted in the main frame plate 100, and the other end is mounted in the stripper plate 153. The stripper plate 153 is secured by screws 159 to the two bearing brackets 116 and 126.

The safety button 56 comprises part of a stamping 164 which is pivoted on a pivot pin 165 carried by the punching lever 55. The stamping has a blocking arm 166 which is normally held by a spring 167 in position to engage a blocking lug 168 which is punched inwardly from the stripper plate 153, in which position of the blocking arm the downward movement of the punching lever 55 is intercepted or blocked. However, by merely depressing the safety button 56, the blocking arm 166 is swung to a position clearing the blocking lug 168, whereupon the punching lever can be fully depressed.

The motion of the punching lever 55 is resiliently transmitted to the tape feeding slide 136 through an actuator link 171 which functions as a resilient extension of the punching lever 55. This actuator link 171 comprises a web portion 171a from which extend two side flanges 171b which have pivotal mounting on the pivot sleeve 157'. A torsion spring 172 coiled about the pivot sleeve 157' has an intermediate loop portion reacting upwardly against the lever and has end portions reacting downwardly on the actuator link, whereby this link is resiliently urged in a clockwise direction relatively to the lever, as viewed in Figure 9. Pivotal movement of the actuator link in this direction relatively to the lever is adjustably limited by an adjusting screw 175 which has threaded mounting in the web 171a of the actuator link and which has its upper end adapted to abut the top wall 55a of the punching lever.

The side flange 171b of the actuator link which lies adjacent to the main frame plate 100 extends beyond the end of the punching lever and carries a roller 178 which has a one-way push connection against the end of a short downwardly extending arm 180a of slide actuating lever 180. This lever 180 is pivoted on a pivot stud 182 carried by the frame plate 100, and is normally biased in a clockwise direction by a biasing spring 184 which is coiled about a spacing post 186 and has one end acting downwardly against the lever arm 180a. The long downwardly extending arm 180b of the lever 180 carries a roller 188 which engages in a transverse or vertical slot 190 formed in the tape feeding slide 135. The roller 188 is held in the slot 190 by a stationary hold-down bar 192 which is secured by screws 194 to spacing posts 196, 196' and which prevents outward displacement of the lever arm 180b from its normal position with roller 188 engaging in slot 190. The tape feeding slide 136 is guided between the lower edge of the mounting plate 98 and the upper edge of a lug 198 which is punched to extend laterally from the lower edge of main frame plate 100. It will be seen from the foregoing that the initial part of the downward movement of punching lever 55 is immediately effective for imparting sliding movement to the tape feeding slide 136, and that the yielding motion transmitting connection established through actuator link 171 will permit the motion of the slide 136 to be intercepted and blocked at any point in its path of travel P, without interfering with the remaining movement of the punching lever through to the completion of ist stroke.

The word spacing lever 58 which projects downwardly from the lower corner of the housing 50 is arranged to impart sliding movement to the tape feeding slide 136. This word spacing lever is mounted on a pivot screw 202 supported in the main frame plate 100, the upper end of said lever being arranged to impart sliding movement to the end of the tape feeding slide 136. A lug 58b projects laterally from the upper end of lever 58 to play in an arcuate slot 204 cut in the main frame plate 100. The engagement of the lug 58b against the left hand end of the slot 204 determines the limit of retractive movement of the slide 136 to the left (Figure 9), in which position the slide 136 is normally maintained by the retractive force of the biasing spring 184 exerted through the lever 180. The engagement of the lug 58b against the right hand end of the slot 204 determines the limit of tape feeding motion which a single actuation of the word spacing lever 58 can impart to the slide 136. A tension spring 206 connected between the lever 58 and the spacing post 196 normally holds the word spacing lever in its retracted position. The word spacing lever may be operated any number of times in succession to obtain the desired spacing between words or sentences or other required intervals between the punched symbols in the tape; also to obtain enough lead at the beginning and end of the tape to permit the tape to be properly threaded into the keyer before the message containing portion starts, and to clearly indicate at the end that the message has been completed. Likewise, at the end of a message the word spacing lever 58 is operated enough times to eject all of the perforated portion of the tape from the machine before the tape is cut off. The tape magazine 82 which appears in Figure 8 has been removed from Figure 9 in order to show to better advantage the above-described parts which lie directly beneath it, namely the tape feeding slide 136, the lever 180, the hold-down bar 192, the word spacing lever 58, etc. The tape feeding stop finger 135 is in the form of an upwardly projecting flange formed as part of a clip 208 which is riveted to the side of the tape feeding slide 136 (see Figures 12 and 13). This clip also carries the tape feeding dog 137 which will be described more in detail after the description of the tape punching slide 146.

The tape punching slide 146 comprises a main base portion 220, formed with an upwardly extending back web 221 provided with forwardly projecting side flanges 222. This base portion 220 is guided for vertical sliding motion on the front face of the main frame plate 100, being guided along the right hand edge by two vertically spaced guide lugs 223 punched forwardly from the frame plate, and being guided along the left hand edge by a third guide lug 224, also punched forwardly from the frame plate 100 (Figure 20). Formed in the back surface of the base portion 220 is an interlocking slot 230 (Figure 14) into which is adapted to move the adjacent end 110a of the detent slide 110 (Figure 20). When the detent slide 110 is engaging in one of the notches 106 of indexing disc 104, with the selector dial 50 properly indexed, the interlocking end 110a of the slide 110 is withdrawn from interlocking slot 230. When the selector dial 50 is not properly indexed, so that the slide 110 is displaced, the interlocking end 110a of the slide is projected into interlocking slot 230 and the tape punching slide 146 is interlocked against punching movement. This insures that the tape cannot be punched if the selector dial 50 is not properly indexed. Conversely, the slide 110 also prevents operation of the dial 50 if the punching levers 55 and slide 146 have not returned to their starting positions, with the slot 230 in position to receive the interlocking end 110a. Referring again to the construction of the tape punching slide 146, the lower portion of the back web 221 curves forwardly into a box-like lower portion 225 in the front face of which is formed an open front guideway 226 for mounting the bank of perforators 145. These perforators are disposed in side-by-side contacting relation in this open front guideway 226, being disposed below and in the vertical axial plane of the selector discs 141, as previously described. The perforators are retained in this side-by-side contacting relation in the guideway 226 by a cap or cover plate 228 which extends across the open front of the guideway and is held fastened to the main base portion 220 by two screws 229 which thread into tapped holes in the box-like lower portion 225 at the sides of the guideway 226. As shown in Figure 17–19, these perforators 145 are in the form of long punches of rectangular cross-section having their lower cutting ends notched out with two V-shaped notches 145a and 145b extending at right angles to each other to form sharp cutting points or edges at each of the four corners of the punch. Figure 19 shows the notched end of one of the perforators on an enlarged scale.

The tape guide 147 is formed in the opposing faces of the box-like lower portion 225 and of the cap 228, as best shown in Figure 14. Recessed into horizontal notches in the opposing faces of the box-like portion 225 and of the cover cap 228 are two opposing shear blades 231 and 232 which form the bottom surface of the tape guide 147. Defined between the adjacent edges of these two shear blades is a shearing slot 233 in which the lower ends of the perforators 145 are adapted to have snug punching fit, these shear blades and shearing slot defining a movable female die carried by the slide 146 and adapted to coact with the perforators 145 functioning as male dies. The cutting face of each punch 145 is designed by the V-shaped notches to enable it to cut or shear the tape across the open portion of the female die, at right angles to the shearing edges 231, 232, without support for the tape, before it cuts or shears along the supported or shearing edges 231, 232. Extending downwardly from the bottom surfaces of the shear blades 231 and 232 is a rectangular slug chute 235 through which the punched slugs of tape are adapted to be discharged from the machine. This slug chute has laterally extending attaching ears 236 which are secured by screws 237 to the under side of the box-like portion 225 and to the under side of the cap 228. This slug chute 235 extends downwardly through the bottom wall 47 of the housing 40, as shown in Figures 1, 2 and 4.

As shown in Figure 9, the right hand ends of the shear blades 231 and 232 project from the box-like portion 225 and from the cap or cover plate 228, and these projecting end portions have their upper surfaces scored with transverse serrations or small notches 232'. Cooperating with these transverse serrations is a tape holding dog 241 which is pivoted on a pivot pin 242 projecting from a lug 243 which extends from the box-like portion 225. A coil spring 244 normally urges the dog downwardly into or toward the transverse serrations. The tape issuing from the tape guide 147 passes between the dog 241 and the transverse serrations 231', 232'. The action of the holding dog 241 is to hold the tape in each increment of advancement, against the light frictional pull which the tape feeding dog 137 may exert on the tape in its retrograde motion.

Referring to Figures 20–22, the cover cap 228 comprises a long laterally extending arm 246 to the under side of which a tape guide 247 is secured. The tape guide 247 is coextensive with the tape guide 147 in which the tape punching operation is performed. The tape guide 247 has a longitudinal slot 249 therein extending substantially the entire length of the tape guide and being disposed substantially in the median line of the tape. The tape feeding dog 137 operates in the longitudinal plane of this slot 249. This tape feeding dog is pivotally mounted on a pivot pin 252 which projects from a bracket 253, a coil spring 254 being mounted on the pivot pin and connected to swing the dog downwardly into engagement with the tape passing through tape guide 247. The bracket 253 has an arm 255 which extends outwardly beneath the tape guide 247, and mounted on this arm 255 is a narrow friction plate 256 which can move upwardly through the slot 249. The upper surface of this friction plate 256 is provided with transverse serrations, similar to the serrations 231' and 232' in the shear blades 231 and 232. These serrations in the friction plate 256 cooperate with the nose of the tape feeding dog 137, whereby the tape is firmly gripped between the nose of the dog and the transverse serrations when the dog is given a tape feeding motion to the right, as viewed in Figure 9. To transmit the horizontal motion of the tape feeding slide 136 to the bracket 253, the clip 208 is provided with an outwardly projecting flange 258 in which is provided a notch 259 that receives the back edge of the bracket 253. Thus, the bracket 253 is compelled to move horizontally with the tape feeding slide 136, but can rise and fall in the slot 259. The rising movement of the bracket 253 is limited by the arm 255 striking the under side of the tape guide 247, and the falling movement is limited by the top edge of a notch 261 in the outer face of the bracket striking the top side of the tape guide 247. The bracket 253 is guided in its horizontal and vertical movements and is held against cocking by a guide pin 264 which is mounted in the upper part of the bracket and which extends horizontally therefrom for a rather loose sliding fit in a guide hole 266 which extends through the base portion 220 of the tape punching slide 146.

Referring now to the mechanism which moves the tape punching slide 146 in response to the latter part of the motion of the punching lever 55, it will be seen from Figure 20 that a motion transmitting lever 271 is operative between the punching lever and the slide. This motion transmitting lever 271 is pivotally mounted on a transverse pivot pin 272 which is supported at one end in the frame plate 100 and at its other end in the U-shaped bracket 126. The right hand end of the lever 271 carries a roller 273 which is adapted to be engaged by a block 274, which is mounted between the side walls of the punching lever 55. The block 274 is normally spaced from the roller 273 a sufficient distance so that the initial part of the movement of punching lever 55 will have completed the tape measuring function performed through slide 136 before the block 274 engages the roller 273 in the final downward movement of punching lever 55. The resulting rocking movement of lever 271 is transmitted to tape punching slide 146 through a T-shaped link 276 which is pivotally connected to the left hand end of lever 271 on pivot pin 277. The cross bar arms 278 of link 276 fit into notches 279 formed in the forwardly projecting side flanges 222, thereby establishing operative connection between the lever 271 and the tape punching slide 146. The lever 271 is normally held in the position shown, with the slide depressed, by a coil spring 281 which is mounted on the transverse pin 282 supported in the side walls of the punching lever 55. One end of spring 281 presses upwardly against the top wall 55a of punching lever 55 and the other end of said spring reacts downwardly against an extension end 271' of lever 271, thereby normally holding this end of lever 271 depressed.

The punching lever 55 is provided with a full-stroke mechanism 285 which is provided to insure that the punching lever will always be given a full stroke downward before it is allowed to return to its upper normal position. This full stroke mechanism comprises a pendant link 286 which is pivoted to the punching lever 55 at 287, and which is formed with a curvature concentric of the arcuate motion of the punching lever. This pendant link passes between the front and rear sides of a U-shaped link 288 which is pivoted on a pivot pin 289 carried by the frame plate 100. The front and rear sides of the U-shaped link 288 embrace the front and rear sides of a cam or wedge block 290, and a pivot pin 292 passes through both. This pivot pin has a head 294 which swings in an arcuate slot 295 in the frame plate 100. Punched from the surface of the pendant or curved link 286 are upper and lower lugs 296 and 297 which are adapted to strike the upper and lower edges of the U-shaped link 288 substantially at the limits of motion of the punching lever 55. The cam or wedge block has a curved wedging face 298 defining upper and lower ends or corners 298a and 298b which are adapted to have wedging engagement against the curved outer surface 299 of the pendant link 286. A U-shaped spring 301 has one arm thereof fastened by a screw 302 to a lug 303 punched forwardly from the frame plate 100, and has its other arm arranged in sliding engagement against the straight outer edge 304 of wedge block 290. Normally, the parts occupy the positions shown in Figure 20. When the punching lever 55 is started downwardly, the pendant link 286 can slide freely past the curved surface 298 of the wedge block. However, if at any point short of the completion of its downward movement the punching lever should be released, the lower end or corner 298b of the curved surface 298 will immediately wedge or bite into the outer surface 299 of the pendant link 286, thereby preventing return movement of the punching lever. The full stroke mechanism will only be released by continuing the motion of the punching lever downwardly until the upper lug 296 strikes the U-shaped link 288 and swings the link 288 and wedge block 290 down into their lower positions. In such lower positions, the spring 301 is caused to act on the upper portion of the surface 304 of the wedge block, thereby reversely tilting the wedge block and releasing the wedging grip between the block and the pendant link. The punching lever is then free to return to its normal raised position, in which position the lower lug 297 strikes the U-shaped link 288 and swings this link and the wedge block back to their original positions.

In Figure 26, we have shown a modified form of full stroke mechanism comprising a pendant link 306 having ratchet teeth 307 in its outer edge. Cooperating with these ratchet teeth is a ratchet pawl 308 which is pivoted at 309 to a transverse link 311 that is stationarily mounted on frame plate 100. Pin 312 projects forwardly from frame plate 100 and from stationary link 311 and acts as a bearing for the left side of pendant link 306. A tension spring 314 connected between the ratchet pawl 308 and the transverse link 311 tends to center the pawl, with the nose of the pawl pointing toward the pivot pin 312. However, the spacing between the ratchet teeth 307 and the pivot 309 prevents the pawl from taking this centered position, requiring either that the pawl point upwardly or downwardly when it is engaging in the ratchet teeth 307. At the upper and lower ends of the ratchet teeth 307 there are provided notched-out clearance areas 316 and 317 in which the pawl can reverse its direction of ratcheting engagement at the limits of movement of the punching lever 55. The parts are illustrated in the positions they occupy when the punching lever is half-way down in its downward stroke. The ratchet pawl 308 points downwardly into the ratchet teeth 307 in position to prevent retrograde motion of the punching lever if downward motion should be discontinued. Thus, the full stroke of the punching lever 55 must be completed in order to bring the upper clearance area 316 opposite the pawl 308, whereby the pawl can swing over center to point upwardly into the ratchet teeth, thereby permitting the return motion of the punching lever and of the pendant link 306 back to normal position. In normal position, the lower clearance area 317 permits the pawl to swing back through center position to point downwardly into the ratchet teeth upon the next downward stroke of the punching lever.

Referring now to the tape cut-off mechanism which responds to the actuation of the tape cut-off button 62, the punched tape issuing from the vertically moving slide 146 enters a guide 321 which leads into a U-shaped mounting bracket 322. Positioned in this mounting bracket is a stationary male cut-off die 324 of pointed arrowhead outline, and the tape is arranged to pass above this male die 324. Pivotally mounted on a pivot pin 325 passing through the side walls of the mounting bracket 322 is a female cut-off die 326 which has a notched cutting edge that matches with the pointed cutting edge of the male die 324. The female die is normally held in an upwardly inclined position above the male die by a coil spring 327 which surrounds the pivot pin 325 at the sides of the female die. The ends of this spring 327 seat in cavities in the female die, and the reacting middle portion of the spring bears against a transverse bolt 328 passing through the upper portion of the bracket 322. The female die has a solid hub portion 329 which is pivoted on the pivot pin 325, and the tape passes below this solid hub portion and thence outwardly through the discharge slot 60 in the end wall of the housing 40.

The cut-off button 62 operates to swing the female cut-off die 326 downwardly into cutting position through the instrumentality of a vertically moving slide 331. This slide has slidable mounting on a mounting plate 332 which is mounted midway between the side flanges 322' of the bracket 322 on through bolts 328 and 330 which pass through said side flanges. Spacing sleeves 333 on the through bolts 328 and 330 space the mounting plate 332 midway between the side flanges 322' of bracket 322. The slide 331 has upper and lower guide slots 335 which have sliding engagement over the shanks of screws 336 threading into the mounting plate 332. Mounted at the lower end of the slide 331 on opposite sides thereof are rollers 338 which bear against the top of the female cut-off die 326. Thus, downward movement of the button 62 operates through the slide 331 and rollers 338 to swing the female cut-off die 326 downwardly in a tape cutting operation against the tension of the spring 327. It will be noted that the cut-off dies cut an arrow notch formation denoting the trailing end of that section of tape issuing from the machine, and cut an arrowhead formation denoting the leading end of the section of tape still remaining in the machine. The upper end of the slide 331 has a U-shaped downturned flange 340 which normally occupies a position directly above the aperture 72 in the front housing section 41, into which aperture the crank pin 70 on handle 66 normally extends. Thus, when the keying handle 66 is in its normal inoperative position, the crank pin 70 is in position to block the depressing of cut-off button 62. It is only when the keying handle 66 is in its operative position that the cut-off button 62 can be depressed, whereby the likelihood of accidental operation of the cut-off button 62 is minimized.

The keying mechanism, designated 350, and illustrated in Figures 27 and 28 is mounted on the mounting plate 332, and comprises a tape receiving guide 351 which is in alignment with the tape receiving slot 64, and a tape discharge guide 352 which is in alignment with the tape discharge slot 74, both guides being supported on the mounting plate 332. The inner end of the receiving guide 351 is in alignment with the lower side of a sprocket wheel 353, and the inner end of the discharge guide is in alignment with the upper side of said sprocket wheel. The sprocket wheel comprises a hub portion 354 from which extend sprocket teeth 355 that are received in the sprocket holes 85 along the edge of the tape t. The tape is inserted into the tape receiving slot 64 with the sprocket hole edge toward the sprocket tooth side of the keyer. Secured over the hub portion 354 is an insulating ring 356, and fitting over this insulating ring is a contact ring 357 which aligns with or lies under the punched code perforations in the tape. Engaging with the contact ring 357 between the tape receiving and discharge points of the sprocket wheel is a resilient conducting brush 358. The anchored end of this brush is secured to an insulating block 359 which is mounted between the tape-receiving and discharge guides 351 and 352. When using plain tape, not provided with sprocket holes 85, the feeding of the tape is accomplished by using a pair of geared or simultaneously driven rollers which frictionally pull the tape through the keying mechanism.

Surrounding the major portion of the sprocket wheel from its tape receiving point to its tape discharge point is a shoe 361 composed of insulating material. This shoe is pivoted on a pivot screw 362 carried by the mounting plate 332, and is yieldingly pressed toward the sprocket wheel 353 by a leaf spring 363 fastened to a lug 364 projecting from the mounting plate 332. Mounted in a radial bore 365 in the shoe 361 is a stylus contact 366 having a pointed inner end which is adapted to enter the message perforations in the tape t, and to make contact with the contact ring 357 through these perforations. Mounted on the shank of the stylus contact 366 is a ball section 367 which has a loose fit in the bore 365 to permit slight tilting of the stylus contact relatively to the bore. The outer end of the stylus contact has a shouldered pin end 368 over which fits the apertured end of a stylus spring 369 which establishes electrical engagement with the stylus contact and resiliently presses the contact inwardly for maintaining it yieldingly pressed into engagement with the tape. The conductors 371 and 372 of the extension cord 76 connect respectively to the brush 358 at the brush block 359, and to the stylus spring 369 at the shoe 361. Hence, a circuit is established between these two conductors each time that the stylus contact 366 makes engagement with the contact ring 357 through the message perforations in the tape, whereby the keying or transmission of the message is effected.

The sprocket 353 is mounted on a shaft 374 which has bearing support in the mounting plate 332, and connected to this shaft on the back side of the mounting plate is a spur gear 375. Meshing with this spur gear is a spur pinion 376 which is mounted on the inner end of a shaft 377 that is journaled in the main frame plate 100. The outer end of this shaft 377 carries the hub 68 that mounts the keying handle 66, from which it will be seen that rotation of this keying handle operates to drive the sprocket wheel 353 to feed the punched tape through the keying mechanism 350.

The roll of tape is inserted loosely into the magazine 82, with the sprocket hole edge of the tape opposite to the dial side of the machine. The leading end of the tape is threaded into the tape guide 247 which has its tape receiving end in immediate proximity to the magazine 82. The tape is pushed into the tape guide 247 until it passes under the tape feeding dog 137, whereupon the operation of the word spacer 58 will continue to feed the tape through the punching guide 147 and out through the discharge slot 60 in the end of the machine. Thereupon, the automatic keying handle 66 is lifted from its inoperative position and the cut-off button 62 is depressed for cutting the tape to produce an arrowhead for identifying the leading end of the section of tape on which a message is to be recorded.

The machine is now ready for the punching of a message in the tape.

The magazine 82 has a solid back plate 82a to which is riveted a laterally projecting flanged rim 82b to form a circular pocket for receiving the roll of tape. A retainer bar 80a is secured to the inner side of the hinged cover 80 (Figure 6) to hold the roll of tape upright in the magazine 82.

While we have illustrated and described what we regard to be the preferred embodiment of our invention, nevertheless it will be understood that such is merely exemplary and that numerous modifications and rearrangements may be made therein without departing from the essence of the invention.

We claim:

1. A machine for perforating indicia in a tape, comprising a housing, a plurality of tape-perforating elements disposed in abutting side-by-side relation within said housing, said elements being mounted for simultaneous or independent movement to effect perforation of predetermined indicia in such tape, die means mounted within said housing in registered relation with said elements, said means having the surface thereof, adjacent said elements and over which such tape is positioned, provided with an elongated cavity into which selected elements simultaneously extend and are accommodated subsequent to perforating such tape, tape-feed means mounted within said housing and operable to effect movement of such tape past said die-means when said elements are out of contact with such tape, adjustable means mounted on said housing for selecting said elements to perforate predetermined indicia in such tape, and actuating means mounted on said housing and operatively connected to said elements to effect actuation of said selected elements.

2. A machine for perforating indica in a tape, comprising a housing, a plurality of tape-perforating elements disposed in abutting side-by-side relation within said housing, said elements being mounted for simultaneous or independent reciprocatory movement to effect perforation of predetermined indicia in such tape, die means mounted within said housing and disposed in registered relation with said elements, said means having the surface thereof, adjacent said elements and over which such tape is positioned, provided with an elongated cavity of a size capable of accommodating a single element or simultaneously all of said elements subsequent to perforating such tape, adjustable means disposed within said housing for selecting said elements to perforate predetermined indicia in such tape and actuating means mounted on said housing and operatively connected to said elements to effect actuation of said selected elements through such tape and into said elongated cavity.

3. A machine for perforating indicia in a tape, comprising a housing, a plurality of tape-perforating elements disposed in abutting side-by-side relation within said housing, said elements being mounted for simultaneous or independent reciprocatory movement to effect, when actuated in one relative direction, perforation of predetermined indicia in such tape, die means mounted within said housing in registered relation with said elements, said means having the surface thereof, adjacent said elements and over which such tape is positioned, provided with an elongated cavity of a size capable of accommodating a single tape-perforating element or simultaneously more than one of said elements subsequent to perforating such tape, tape-feed means disposed within said housing and mounted for reciprocatory movement on said die means to effect, when moving in one relative direction, movement of such tape across the cavitated surface of said die means when said tape-perforating elements are out of contact with such tape, adjustable stop means disposed within said housing adjacent the path of movement of said tape-feed means and engageable by the latter to vary the length of travel of said tape-feed means in said one relative direction, control means adjustably mounted on said housing and operatively connected to said stop means to effect selected adjustment of the latter, and actuating means mounted on said housing and operatively connected to said tape-feed means to effect movement thereof in said one relative direction and operatively connected to said tape-perforating elements to effect movement of said selected elements through such tape and into said elongated cavity, one of said movements effected by said actuating means preceding the other movement.

4. A machine for perforating indicia in a tape, comprising a housing, a plurality of tape-perforating elements, disposed in abutting side-by-side relation within said housing, said elements being mounted for simultaneous or independent reciprocatory sliding movement to effect, when actuated in one relative direction, perforation of predetermined indicia in such tape, die means movably mounted within said housing and having a first portion thereof encompassing and carrying said elements, and a second portion thereof provided with a cavitated surface over which such tape is positioned, said cavitated surface having the cavity thereof in registered relation with the corresponding ends of said elements and of such size as to accommodate the end portions of one or more of said elements simultaneously subsequent to said element end portions perforating such tape, an element selector rotatably mounted within said housing and having the axis of rotation thereof disposed transversely with respect to the direction of movement of said elements, said selector having peripheral protuberances formed thereon for selective engagement with the opposite corresponding end portions of said elements to effect actuation thereof into perforating predetermined indicia on such tape, control means adjustably mounted on said housing and operatively connected to said selector to effect rotation thereto to predetermined positions, and actuating means mounted on said housing and operatively connected to said elements to effect actuation of the latter in a direction toward the rotary axis of said selector and engagement of said peripheral protuberances by selected elements whereby the latter effect perforation of predetermined indicia in such tape upon continued movement of the remaining elements in said direction.

5. A machine for perforating indicia in a tape, comprising a housing, a plurality of tape-perforating elements disposed in abutting side-by-side relation within said housing, said elements being mounted for simultaneous or independent movement to effect, when actuated in one relative direction, perforation of predetermined indicia in such tape, die means mounted within said housing and provided with a cavitated surface adjacent the corresponding end portions of said elements and over which such tape is positioned, the cavity of said cavitated surface being of such size as to simultaneously accommodate all of the end portions of said elements subsequent to the latter perforating such tape, tape-feed means disposed within said housing and mounted for reciprocatory movement on said die means and adapted, when moving in one relative direction, to feed a predetermined segment of such tape across said cavity, a rotatabled drum-like member mounted within said housing and having the rotary axis thereof disposed transversely with respect to the direction of movement of said elements, said member having a first section thereof having peripheral portions thereof disposed within the path of movement of said tape-feed means for selective engagement by the latter to limit the movement of said feed means in said one relative direction, and having a second section thereof axially spaced from said first section and having peripheral portions thereof for selective engagement with said elements to effect tape-perforating movement of the latter, control means adjustably mounted on said housing and operatively connected to said member to effect rotation of the latter to predetermined positions of adjustment, and actuating means mounted on said housing and operatively connected to said tape-feed means and said elements to effect actuation of said feed means in said one direction and actuation of said selective elements into tape-perforating positions.

6. In a machine for perforating indicia in a tape, the combination of manually actuated control means for selecting indicia to be perforated, a selector member rotatably responsive to the actuation of said control means, said member comprising a plurality of substantially flat pieces arranged in face-to-face relation and rotatable as a unit about a common axis, each of said pieces having one or more blocking segments projecting from its periphery, a plurality of tape-perforating elements disposed in the axial plane of said pieces and arranged in abutting side-by-side relation for movement transversely with respect to the axis of rotation of said pieces, each perforating element having an end thereof aligned with a selector piece and being actuated by said aligned piece into tape-perforating position, when contacted by a peripheral blocking segment on said piece, die means provided with a cavitated surface adjacent the opposite tape-piercing ends of said elements and over which the tape is guided, the cavity of said surface being of a size capable of accommodating simultaneously all of said element tape-piercing ends, and means for causing movement in one direction of said perforating elements and said die means relative to said selector pieces whereby those elements encountering blocking segments on their respective selector pieces will have the tape-piercing ends thereof projected into said cavity subsequent to perforating the tape upon continued movement of the remaining elements and said die means in said one direction.

7. The machine recited in claim 1 including tape cutoff means mounted within said housing and selectively operable to sever a predetermined segment of the tape subsequent to the latter being fed past said die means, said cutoff means having the tape-contacting portion thereof shaped to sever such tape whereby the configuration of the trailing edge of such severed tape segment is distinguishable from the configuration of the leading edge of such tape segment.

8. A machine for perforating indicia in a tape, comprising a housing, a plurality of tape-perforating elements disposed in side-by-side relation within said housing, said elements being mounted for simultaneous or independent movement to effect, when actuated in one relative direction, perforation of predetermined indicia in such tape, die means mounted within said housing and provided with a cavitated surface, adjacent the corresponding end portions of said elements and over which such tape is positioned, for accommodating said elements subsequent to penetrating such tape, said cavitated surface effecting support for such tape during perforation thereof only along predetermined spaced peripheral portions of the perforation being formed, selector means mounted within said housing for selective adjustment to positions of engagement with selected elements to effect actuation of the latter into tape-perforating positions upon relative movement of said selector means and said elements, and actuating means mounted on said housing operable to effect relative movement of said selector means and said elements; the end portion of each element, adjacent said die means cavitated surface, being provided with a plurality of relatively spaced symmetrically arranged tape-piercing protuberances which simultaneously penetrate initially the tape at supported portions thereof, the configuration of said protuberances being such that complete severance of the tape across the unsupported peripheral portions of the perforation, being formed, is effected before complete severance of the supported peripheral portions of such perforation, as the element end portion continues penetration of the tape into accommodated relation with said cavitated surface.

9. A machine for perforating indicia in a tape, comprising a housing, a plurality of tape-perforating elements disposed in side-by-side relation within said housing, said elements being mounted for simultaneous or independent movement to effect, when actuated in one relative direction, perforation of predetermined indicia in such tape, die means mounted within said housing and provided with a cavitated surface, adjacent the corresponding end portions of said elements and over which such tape is positioned, said cavitated surface accommodating said elements subsequent to the latter perforating such tape, tape-feed means disposed within said housing and mounted for reciprocatory movement and adapted, when moving in one relative direction, to feed a predetermined segment of such tape across said cavitated surface, an elongated member mounted for selective movement within said housing, said member having a first section thereof provided with peripheral portions adapted, upon movement of said member, to be disposed within the path of movement of said tape-feed means and to be engaged thereby to selectively limit the movement of said tape-feed means in said one direction, said elongated means having a second section thereof longitudinally spaced from said first section and movable therewith, said second section being provided with peripheral portions for selective engagement with said elements to effect tape-perforating movement of the latter, the peripheral portions on said first and second sections being disposed in a predetermined alignment with respect to one another, control means adjustably mounted on said housing and operatively connected to said member to effect selective movement thereof, and actuating means mounted on said housing and operatively connected to said tape-feed means and said elements to effect actuation of said feed means in said one direction, when said elements are out of contact with such tape, and to effect actuation of said selective elements into tape-perforating positions.

10. A machine for perforating indicia in a tape, comprising a housing, a plurality of elongated elements having corresponding tape-perforating ends, said elements being disposed in abutting side-by-side relation within said housing and mounted for selective simultaneous or independent reciprocatory movement to effect perforation of predetermined indicia in such tape, die means mounted within said housing and having a surface thereof, adjacent the tape-perforating ends of said elements and spaced therefrom when the latter are in a non-perforating position, provided with an elongated cavity overlaid by such tape and into which the tape-perforating ends of the selected elements extend and are accommodated subsequent to perforating such tape, the corresponding opposite side surfaces of the tape-perforating ends of said elements being in slidable engagement with peripheral portions of said cavity when said ends are accommodated thereby, the longitudinal dimension of said cavity being such as to accommodate simultaneously the tape-perforating ends of all or any selected number of said elements whereby the configuration of a perforation formed in such tape may vary from the cross-sectional configuration of the tape-perforating end of a single element to the cross-sectional configuration of the tape-perforating ends of all of said elements, adjustable means mounted on said housing for selecting said elements to perforate a predetermined indicia in such tape, and actuating means mounted on said housing and operatively connected to said elements to effect actuation of said selected elements into tape-perforating movement.

11. The machine recited in claim 10, wherein the cross-sectional configuration of the tape-perforating end of each element is at least that of a quadrilateral having a first pair of opposing sides in slidable engagement with peripheral portions of said die means cavity; disposed at the termini of each side of said first pair of opposing sides are protuberances extending longitudinally of said element, all of said protuberances penetrating the tape overlying the cavitated surface of said die means, upon said element being actuated in one direction; the sides of said element end cross-sectional configuration, disposed between corresponding protuberances of said first pair of opposing sides, spanning said cavity, the axial length of the portions of the protuberances forming said first pair of opposing sides being greater than the axial length of the portions of the protuberances forming the remaining cavity-spanning sides of said tape-perforating end whereby complete severance of the tape along the cavity-spanning sides of said tape-perforating end will be effected before complete severance of the tape along the first pair of opposing sides of said end upon movement of the latter into accommodated relation within said die means cavity.

References Cited in the file of this patent
UNITED STATES PATENTS

| | | |
|---|---|---|
| Re. 20,330 | Morton | Apr. 13, 1937 |
| 18,149 | Humaston | Sept. 8, 1857 |
| 122,098 | Anderson | Dec. 26, 1871 |
| 370,985 | Stimpson | Oct. 4, 1887 |
| 575,497 | Storm | Jan. 19, 1897 |
| 659,433 | Buckingham et al. | Oct. 9, 1900 |
| 779,153 | Franke et al. | Jan. 3, 1905 |
| 877,821 | Barclay | Jan. 28, 1908 |
| 877,823 | Barcley | Jan. 28, 1908 |
| 1,063,818 | McTammany | June 3, 1913 |
| 1,982,453 | Rix | Nov. 27, 1934 |
| 2,213,567 | Mills et al. | Sept. 3, 1940 |
| 2,318,446 | Wolters | May 4, 1943 |
| 2,726,720 | Martin | Dec. 13, 1955 |